(12) United States Patent
Oyasato

(10) Patent No.: US 10,664,446 B2
(45) Date of Patent: May 26, 2020

(54) INFORMATION PROCESSING APPARATUS AND INFORMATION PROCESSING METHOD

(71) Applicant: KYOCERA DOCUMENT SOLUTIONS INC., Osaka (JP)

(72) Inventor: Tomoki Oyasato, Osaka (JP)

(73) Assignee: KYOCERA DOCUMENT SOLUTIONS INC., Osaka (JP)

(*) Notice: Subject to any disclaimer, the term of this patent is extended or adjusted under 35 U.S.C. 154(b) by 219 days.

(21) Appl. No.: 15/761,869

(22) PCT Filed: Aug. 17, 2017

(86) PCT No.: PCT/JP2017/029536
§ 371 (c)(1),
(2) Date: Mar. 21, 2018

(87) PCT Pub. No.: WO2018/083857
PCT Pub. Date: May 11, 2018

(65) Prior Publication Data
US 2019/0073374 A1 Mar. 7, 2019

(30) Foreign Application Priority Data
Nov. 7, 2016 (JP) .................... 2016-216857

(51) Int. Cl.
*G06F 7/02* (2006.01)
*G06F 16/00* (2019.01)
(Continued)

(52) U.S. Cl.
CPC ........ *G06F 16/1744* (2019.01); *G06F 12/023* (2013.01); *G06F 16/1727* (2019.01); *G06F 2212/401* (2013.01)

(58) Field of Classification Search
CPC ............ G06F 16/1727; G06F 16/1744; G06F 12/023; G06F 2212/401; G06F 3/0608; G06F 3/0628; H04N 2201/33347
See application file for complete search history.

(56) References Cited

U.S. PATENT DOCUMENTS

| 8,150,176 B2 * | 4/2012 | Gwak | H04N 19/147 |
| | | | 382/232 |
| 2005/0268052 A1 * | 12/2005 | Hepkin | G06F 12/0866 |
| | | | 711/159 |

(Continued)

FOREIGN PATENT DOCUMENTS

| JP | 1993-274198 A | 10/1993 |
| JP | 2010178283 A | 8/2010 |

OTHER PUBLICATIONS

European Patent Office, European Search Report dated May 15, 2019.

*Primary Examiner* — Bruce M Moser
(74) *Attorney, Agent, or Firm* — Li & Cai Intellectual Property (USA) Office

(57) ABSTRACT

[Solving Means] An information processing apparatus (10) includes: a compressing-and-writing unit (103) that compresses a file-to-be-written, and writes the compressed-file in a memory area; and a total-file-size calculating unit (102) that calculates a total-file-size, the total-file-size being a total value of file-sizes of one or more already-written compressed-files, and updates the total-file-size with a sum of a compressed-file-size and the total-file-size, the compressed-file-size being a file-size of the written compressed-file.

6 Claims, 3 Drawing Sheets

(51) Int. Cl.
*G06F 16/174* (2019.01)
*G06F 12/02* (2006.01)
*G06F 16/17* (2019.01)

(56) References Cited

U.S. PATENT DOCUMENTS

2010/0228800 A1* 9/2010 Aston ................. G06F 16/1744
707/822
2011/0218974 A1* 9/2011 Amit ...................... G06F 16/00
707/693
2015/0378613 A1 12/2015 Koseki \* cited by examiner

INFORMATION PROCESSING APPARATUS AND INFORMATION PROCESSING METHOD

BACKGROUND OF THE INVENTION

1. Field of the Invention

The present disclosure relates to an information processing apparatus and an information processing method capable of compressing a file-to-be-written and writing the compressed-file in a memory area.

2. Description of Related Art

There is known a technique of compressing a file-to-be-written and writing the compressed-file in a memory area (Patent Literature 1).

CITATION LIST

Patent Literature

Patent Literature 1: Japanese Patent Application Laid-open No. H05-274198

SUMMARY OF THE INVENTION

Technical Problem

In a technique of compressing-and-writing a file, it is desirable to increase the rate of accurately determining whether an error-in-writing will occur or not before writing a file in the technique of compressing-and-writing the file.

Solution to Problem

According to an embodiment of the present disclosure, an information processing apparatus includes:
  a compressing-and-writing unit that compresses a file-to-be-written, and writes the compressed-file in a memory area; and
  a total-file-size calculating unit that
    calculates a total-file-size, the total-file-size being a total value of file-sizes of one or more already-written compressed-files, and
    updates the total-file-size with a sum of a compressed-file-size and the total-file-size, the compressed-file-size being a file-size of the written compressed-file.

According to the present embodiment, the total-file-size of the (not uncompressed but) compressed-file is calculated. As a result, the difference between the (information of) total-file-size and the area-written-in-fact in the memory area can be minimized.

According to an embodiment of the present disclosure, an information processing method includes:
  compressing a file-to-be-written, and writing the compressed-file in a memory area;
  calculating a total-file-size, the total-file-size being a total value of file-sizes of one or more already-written compressed-files; and
  updating the total-file-size with a sum of a compressed-file-size and the total-file-size, the compressed-file-size being a file-size of the written compressed-file.

Advantageous Effects of Invention

According to the present disclosure, in a technique of compressing-and-writing a file, it is possible to increase the rate of accurately determining whether an error-in-writing will occur or not before writing a file.

Note that the effects described here are not necessarily limitations, but any effects described in the present disclosure may be obtained.

DETAILED DESCRIPTION OF THE PREFERRED EMBODIMENTS

Hereinafter, an embodiment of the present disclosure will be described with reference to the drawings.

In the present embodiment, an image forming apparatus (Multifunction Peripheral, hereinafter simply referred to as MFP) will be described as an example of an information processing apparatus.

1. Hardware Configuration of Image Forming Apparatus

Figure 1:
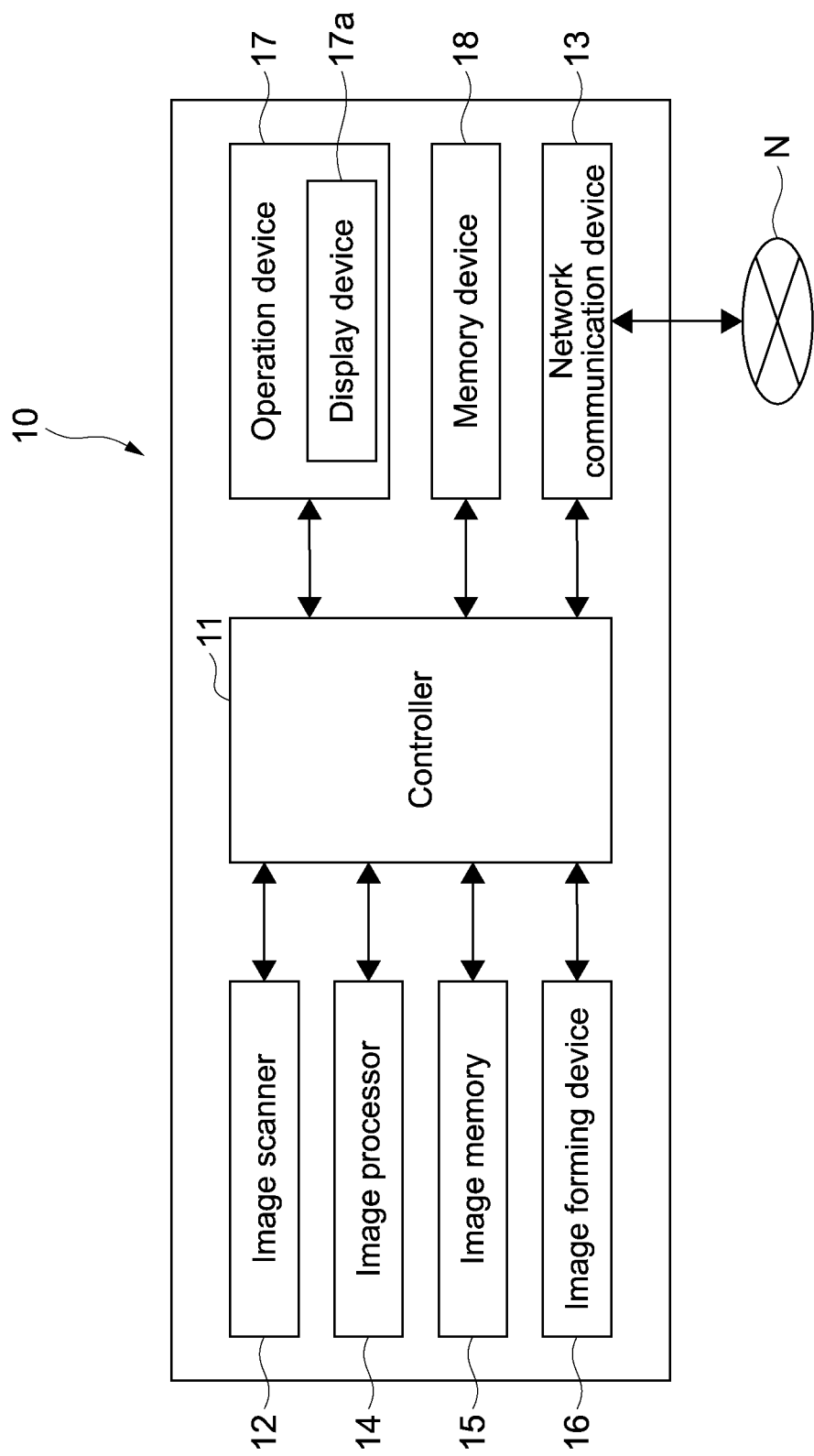
FIG. 1 A hardware configuration of an image forming apparatus according to an embodiment of the present disclosure.

FIG. 1 shows a hardware configuration of an image forming apparatus according to an embodiment of the present disclosure.

The MFP 10 includes a controller 11. The controller 11 includes a CPU (Central Processing Unit), a RAM (Random Access Memory), a ROM (Read Only Memory), dedicated hardware circuits, and the like and performs overall operational control of the MFP 10. A computer program that causes the MFP 10 to operate as the respective functional units (to be described later) is recorded in a non-transitory computer readable recording medium such as a ROM.

The controller 11 is connected to an image scanner 12, an image processor 14, an image memory 15, an image forming device 16, an operation device 17, a memory device 18, a network communication device 13, and the like. The controller 11 performs operational control of the respective devices connected thereto and sends/receives signals and data to/from those devices.

According to job execution instructions input by a user via the operation device 17 or a personal computer (not shown) connected to the network N, the controller 11 controls drive and processing of mechanisms requisite for executing operational control of functions such as a scanner function, a printing function, and a copy function.

The image scanner 12 captures an image from a document.

The image processor 14 carries out image processing as necessary on image data of an image read by the image scanner 12. For example, the image processor 14 corrects shading of an image read by the image scanner 12 and carries out other image processing to improve the quality of the image to be formed.

The image memory 15 includes an area that temporarily stores data of a document image read by the image scanner 12 or data to be printed by the image forming device 16.

The image forming device 16 prints an image on a sheet or the like based on the image data obtained by the image scanner 12.

The operation device 17 includes a touch panel device and an operation key device that accept user's instructions on various operations and processing executable by the MFP 10. The touch panel device includes a display device 17a such as an LCD (Liquid Crystal Display) equipped with a touch panel.

The network communication device 13 is an interface used for connecting to the network.

The memory device 18 is a large-volume memory device such as an HDD (Hard Disk Drive) that stores a document image read by the image scanner 12, and the like.

2. Functional Configuration of Image Forming Apparatus

Figure 2:
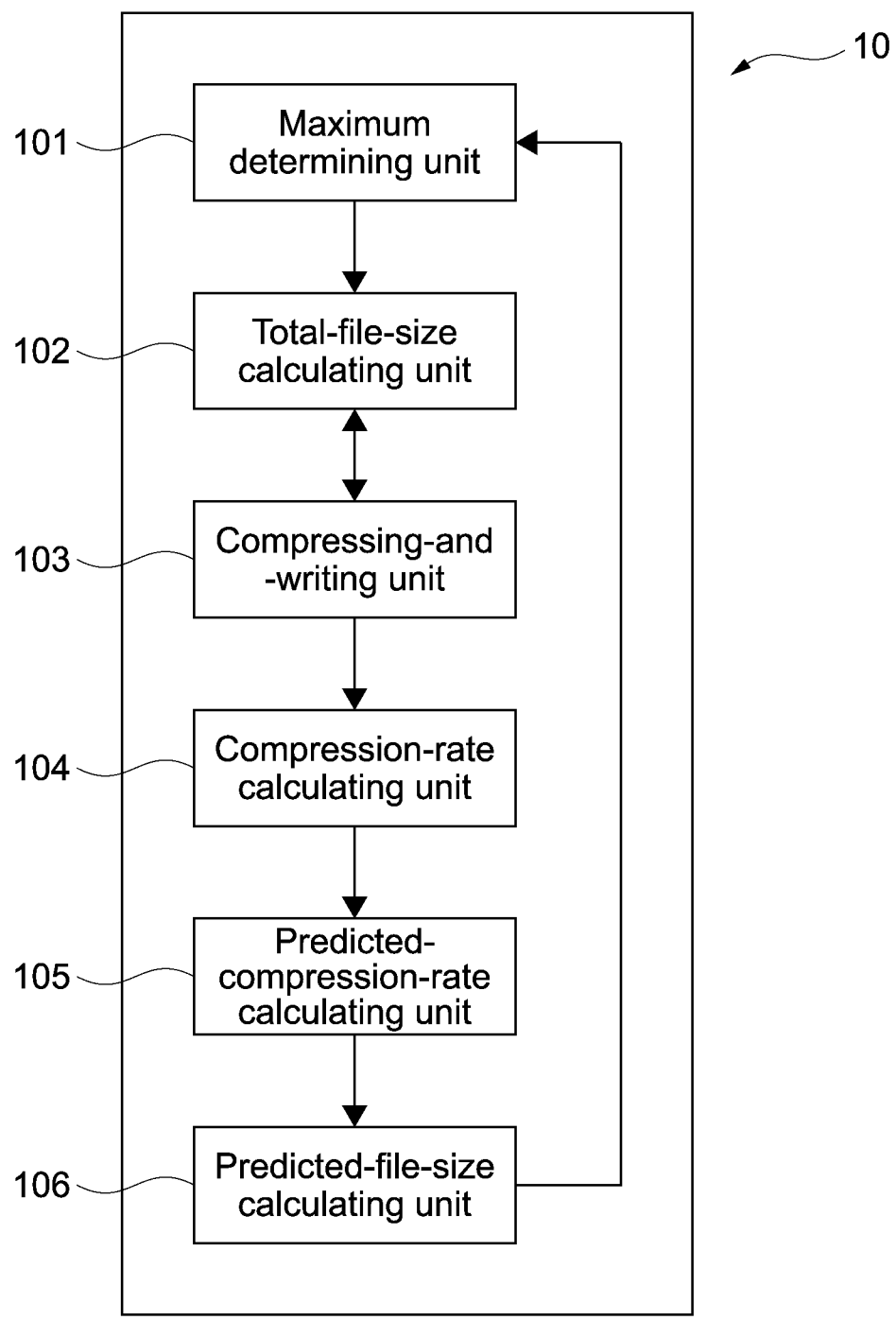
FIG. 2 A functional configuration of the image forming apparatus.

FIG. 2 shows a functional configuration of the image forming apparatus.

The MFP 10 loads an information processing program stored in the ROM, which is an example of a non-transitory computer readable recording medium, in the RAM and executes the information processing program to thereby function as the maximum determining unit 101, the total-file-size calculating unit 102, the compressing-and-writing unit 103, the compression-rate calculating unit 104, the predicted-compression-rate calculating unit 105, and the predicted-file-size calculating unit 106.

The total-file-size calculating unit 102 calculates a total value (referred to as "total-file-size") of file-sizes of a plurality of already-written compressed-files, and updates the total-file-size with a sum of a file-size of a written compressed-file (referred to as "compressed-file-size") and the total-file-size.

The maximum determining unit 101 determines whether a sum of a file-size of an uncompressed-file-to-be-written (will be written) (referred to as "uncompressed-file-size") and the total-file-size is larger than a maximum size of a memory area or not.

The compressing-and-writing unit 103 compresses the file-to-be-written, and writes the compressed-file in the memory area.

The compression-rate calculating unit 104 calculates a compression-rate of the compressed-file based on the uncompressed-file-size and the compressed-file-size.

The predicted-compression-rate calculating unit 105 calculates a predicted-compression-rate of an uncompressed-file-to-be-written based on a plurality of compression-rates of the plurality of already-written compressed-files.

The predicted-file-size calculating unit 106 calculates a compressed-file-size (referred to as "predicted-file-size") where the file-to-be-written is compressed based on the predicted-compression-rate calculated by the predicted-compression-rate calculating unit 105.

Out of the total-file-size, the maximum size of the memory area, the compressed-file, the compression-rate, and the predicted-compression-rate, at least the total-file-size and the compression-rate are stored in a nonvolatile memory.

3. Operational Flow of Image Forming Apparatus

Figure 3:
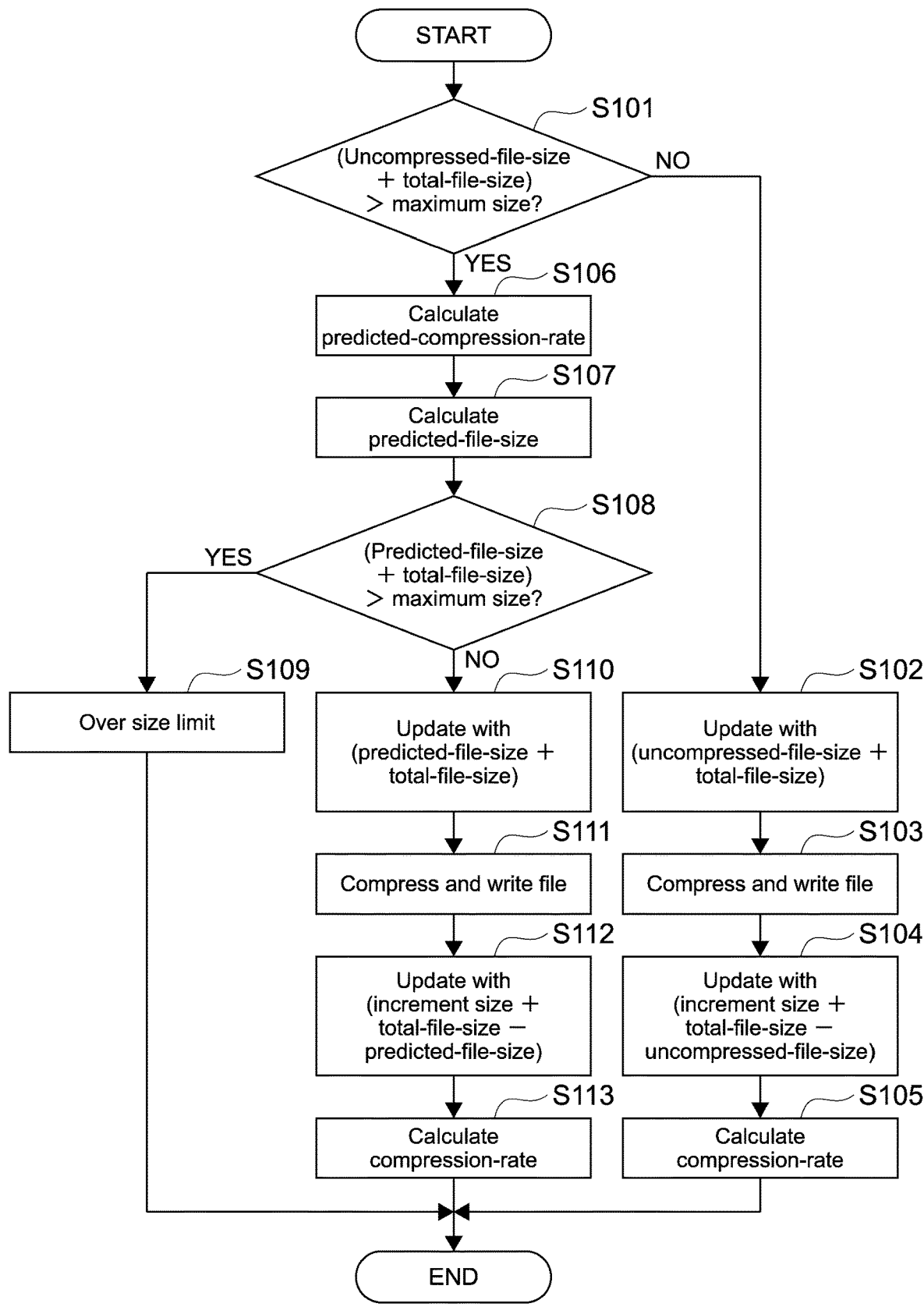
FIG. 3 An operational flow the image forming apparatus.

FIG. 3 is an operational flow the image forming apparatus.

The operation is based on the following premise. The maximum size of a memory area of the MFP 10, in which a certain kind of data file can be written, is predetermined. The OS (Operating System) of the MFP 10 has a function of compressing a file-to-be-written and writing the compressed-file in the memory area to write the certain kind of data file. The "certain kind of data file" is, for example, an application execution file or the like, is a file for software additionally installed according to configuration made by a user, and excludes firmware information or the like permanently stored.

The operation is further based on the following premise. The total-file-size calculating unit 102 has calculated a total value (referred to as "total-file-size") of file-sizes of a plurality of already-written compressed-files. Specifically, every time a compressed-file is written, the total-file-size calculating unit 102 updates the total-file-size with a sum of the file-size of the written compressed-file (referred to as "compressed-file-size") and the total-file-size. A method of updating the total-file-size by the total-file-size calculating unit 102 will be described later in detail.

Upon receiving an instruction to write a file (uncompressed), the maximum determining unit 101 determines whether a sum of a file-size of an uncompressed-file-to-be-written (will be written) (referred to as "uncompressed-file-size") and the total-file-size is larger than the maximum size of the memory area or not (Step S101).

Where the maximum determining unit 101 determines that the sum (first sum) of the uncompressed-file-size and the total-file-size is the maximum size or less (Step S101, NO), the total-file-size calculating unit 102 updates the total-file-size with the sum (first sum) of the uncompressed-file-size and the total-file-size before the compressed-file is written (Step S102). As a result, the sum (first sum) of the uncompressed-file-size and the total-file-size is stored in the nonvolatile memory as the total-file-size.

After the total-file-size is updated, the compressing-and-writing unit 103 compresses the file-to-be-written, and writes the compressed-file in the memory area (Step S103).

After the compressed-file is written, the total-file-size calculating unit 102 calculates an increased size of the memory area after the writing (Step S103) (referred to as "increment size"). The total-file-size calculating unit 102 updates the total-file-size with a sum (second sum) of the increment size and the present total-file-size (i.e., total-file-size updated with sum (first sum) of uncompressed-file-size and total-file-size). As a result, a sum (second sum) of the total-file-size, which is updated with the sum (first sum) of the uncompressed-file-size and the total-file-size, and the increment size is stored in the nonvolatile memory as the total-file-size. Next, the total-file-size calculating unit 102 subtracts the uncompressed-file-size (sum of Step S102) from the updated total-file-size (second sum) to thereby update the total-file-size (Step S104).

In short, the total-file-size calculating unit 102 calculates (total-file-size at the start of the operational flow of FIG. 3+uncompressed-file-size+increment size−uncompressed-file-size) (Steps S102, S104) to thereby calculate (total-file-size at the start of the operational flow of FIG. 3+increment size) as a result. Finally, the total-file-size calculating unit 102 updates the total-file-size with the calculated (total-file-size at the start of the operational flow of FIG. 3+increment size).

After the total-file-size is updated, the compression-rate calculating unit 104 calculates a compression-rate of the compressed-file based on the uncompressed-file-size and the compressed-file-size (Step S105).

Meanwhile, where the maximum determining unit 101 determines that the sum (first sum) of the uncompressed-file-size and the total-file-size is larger than the maximum size (Step S101, YES), the predicted-compression-rate calculating unit 105 calculates a predicted-compression-rate of the uncompressed-file-to-be-written based on the plurality of compression-rates of the plurality of already-written compressed-files (Step S106). For example, the predicted-compression-rate calculating unit 105 calculates the predicted-compression-rate of the uncompressed-file-to-be-written based on the minimum compression-rate out of the plurality of compression-rates of the plurality of already-written compressed-files. For only an example, the predicted-compression-rate calculating unit 105 may use the minimum compression-rate as the predicted-compression-rate. For another example, the predicted-compression-rate calculating unit 105 may use (minimum compression-rate–standard deviation, or average compression-rate–3*standard deviation, for example) as the predicted-compression-rate to compensate variations.

The predicted-file-size calculating unit 106 calculates a compressed-file-size where the file-to-be-written is compressed based on the predicted-compression-rate calculated by the predicted-compression-rate calculating unit 105 (referred to as "predicted-file-size") (Step S107).

The maximum determining unit 101 determines whether the sum (third sum) of the predicted-file-size calculated by the predicted-file-size calculating unit 106 and the total-file-size is larger than the maximum size or not (Step S108).

Where the maximum determining unit 101 determines that the sum (third sum) of the predicted-file-size and the total-file-size is larger than the maximum size (Step S108, YES), it is highly likely that the compressed-file cannot written in the memory area, and an error occurs since it is over the size limit (Step S109).

Meanwhile, where the maximum determining unit 101 determines that the sum (third sum) of the predicted-file-size and the total-file-size is the maximum size or less (Step S108, NO), the total-file-size calculating unit 102 updates the total-file-size with the sum (third sum) of the predicted-file-size and the total-file-size before the compressed-file is written (Step S110). As a result, the sum (third sum) of the predicted-file-size and the total-file-size is stored in the nonvolatile memory as the total-file-size.

After the total-file-size is updated, the compressing-and-writing unit 103 compresses the file-to-be-written, and writes the compressed-file in the memory area (Step S111. Completely the same as Step S103).

After the compressed-file is written, the total-file-size calculating unit 102 calculates an increment size, the increment size being an increased size of the memory area after the writing (Step S111). The total-file-size calculating unit 102 updates the total-file-size with the sum (fourth sum) of the increment size and the present total-file-size (i.e., total-file-size updated with sum (third sum) of predicted-file-size and total-file-size). As a result, the sum (fourth sum) of the total-file-size, which is updated with the sum (third sum) of the predicted-file-size and the total-file-size, and the increment size is stored in the nonvolatile memory as the total-file-size. Next, the total-file-size calculating unit 102 subtracts the predicted-file-size (sum of Step S110) from the updated total-file-size (fourth sum) to thereby update the total-file-size (Step S112).

In short, the total-file-size calculating unit 102 calculates (total-file-size at the start of the operational flow of FIG. 3+predicted-file-size+increment size–predicted-file-size) (Steps S110, S112), to thereby calculate (total-file-size at the start of the operational flow of FIG. 3+increment size) as a result. Finally, the total-file-size calculating unit 102 updates the total-file-size with the calculated (total-file-size at the start of the operational flow of FIG. 3+increment size).

After the total-file-size is updated, the compression-rate calculating unit 104 calculates the compression-rate of the compressed-file based on the uncompressed-file-size and the compressed-file-size (Step S113. Completely the same as Step S105).

4. Conclusion

The maximum size of a memory area of an MFP, in which a certain kind of data file can be written, is predetermined. The OS of MFP 10 has a function of compressing a file-to-be-written and writing the compressed-file in the memory area to write the certain kind of data file. In such a compressing-and-writing system, a user cannot know a compressed-file-size. Since a user cannot know a compressed-file-size, the user cannot know whether the compressed-file can be recorded (can be written) in the memory area or not before the compressed-file is written. To know whether the compressed-file can be recorded (can be written) in the memory area is helpful for a user, for example, to logically divide the memory area and to manage the size of the memory area. In view of this, a user may check whether a file can be written or not based on the maximum size of the memory area before the file is compressed-and-written. However, the user cannot know the file-size of the compressed-file before the file is compressed-and-written. Because of this, all the user can do is to check whether the file-size of the uncompressed-file is within the maximum size of the memory area or not. However, where the file-size of the uncompressed-file is larger than the maximum size of the memory area, even if the compressed-file can be recorded (can be written actually) in the memory area, the compressed-file may not be written since it may be over the size limit.

In view of this, according to the present embodiment, the total-file-size calculating unit 102 calculates a total value of file-sizes of a plurality of already-written compressed-files (total-file-size), and updates the total-file-size with a sum of a file-size of the written compressed-file (compressed-file-size) and the total-file-size (Steps S102 and S104, Steps S110 and S112). Before the file-to-be-written is written, where a sum of a file-size of the uncompressed-file-to-be-written (uncompressed-file-size) and the total-file-size is larger than a maximum size of the memory area (Step S101, NO), the maximum determining unit 101 determines whether a sum of a compressed-file-size (predicted-file-size) where the file-to-be-written is compressed based on the predicted-compression-rate and the total-file-size is larger than the maximum size or not (Step S108).

Further, according to the present embodiment, the total-file-size calculating unit 102 calculates a total value (total-file-size) of file-sizes of a plurality of compressed-files. Further, if a file having the uncompressed-file-size cannot be written (an error occurs since it is over the size limit), the maximum determining unit 101 determines whether the compressed-file can be written or not based on the predicted-file-size. In this manner, the maximum is determined based on the total-file-size of the (not uncompressed but) compressed-file and the predicted-file-size of the compressed-file. As a result, the difference between the (information of) total-file-size and the area-written-in-fact in the memory area can be minimized. As a result, it is possible to determine that a file cannot be written (an error occurs since it is over the size limit) more reliably. It is possible to reduce a case where a compressed-file can be written actually but is not written (an error occurs since it is over the size limit).

According to the present embodiment, the total-file-size calculating unit 102 updates the total-file-size as follows specifically. Before the compressed-file is written, the total-file-size calculating unit 102 updates the total-file-size with a sum of the uncompressed-file-size (or predicted-file-size) and the total-file-size (Step S102 or S110). After the compressed-file is written (Step S103 or S111), the total-file-size calculating unit 102 calculates an increment size, the increment size being an increased size of the memory area after the writing, updates the total-file-size with a sum of the increment size and the total-file-size, and subtracts the uncompressed-file-size (or predicted-file-size) from the updated total-file-size to thereby update the total-file-size (Step S104 or S112).

Let's say, without executing Step S102 or S110, after a compressed-file is written, a total-file-size is updated with a sum of an increment size and the total-file-size, simply. Let's say, in this case, for example, the MFP is powered off during writing the compressed-file or after writing the compressed-file and before updating the total-file-size, and, as a result, the total-file-size is not updated (increment size is not added). In this case, although at least part of the compressed-file is written, the total-file-size is not updated (increment size is not added). As a result, the difference between the (information of) total-file-size and the area-written-in-fact in the memory area becomes larger. As a result, when a file is written next time, a maximum size is determined based on a total-file-size, which is smaller than the actual total-file-size. As a result, the MFP may start writing despite the fact that the compressed-file cannot be written actually (an error occurs since it is over the size limit).

To the contrary, according to the present embodiment, before the compressed-file is written, the total-file-size is updated with the sum of the uncompressed-file-size (or predicted-file-size) and the total-file-size (Step S102 or S110). Let's say the MFP is powered off during writing or after writing the compressed-file, and, as a result, the total-file-size is not further updated (Step S104 or S112). Even in this case, since the uncompressed-file-size (or predicted-file-size) is added to the total-file-size tentatively, the difference between the (information of) total-file-size and the area-written-in-fact in the memory area is still minimized. As a result, when a file is written next time, a maximum size is determined based on the total-file-size, to which the uncompressed-file-size (or predicted-file-size) is added tentatively. As a result, the MFP may not be likely to start writing despite the fact that the compressed-file cannot be written actually (an error occurs since it is over the size limit).

Further, According to the present embodiment, every time a file is written, the compression-rate calculating unit 104 calculates the compression-rate of the compressed-file (Step S105 or S113). The predicted-compression-rate calculating unit 105 calculates the predicted-compression-rate based on the plurality of compression-rates of the plurality of already-written compressed-files (Step S106). As a result, since the predicted-compression-rate is calculated based on all the compression-rates of all the already-written compressed-files, it is possible to calculate the predicted-compression-rate accurately. Specifically, the predicted-compression-rate calculating unit 105 calculates the predicted-compression-rate based on the minimum compression-rate out of all the compression-rates. The predicted-file-size calculating unit 106 calculates the predicted-file-size where the file-to-be-written is compressed based on the predicted-compression-rate (based on minimum compression-rate) (Step S107). Since it is based on the minimum compression-rate, the predicted-file-size is the largest predictable file-size. As a result, the MFP may not be likely to start writing despite the fact that the compressed-file cannot be written actually (an error occurs since it is over the size limit).

It should be understood by those skilled in the art that various modifications, combinations, sub-combinations and alterations may occur depending on design requirements and other factors insofar as they are within the scope of the appended claims or the equivalents thereof.

What is claimed is:

1. An information processing apparatus, comprising:
a memory that stores an information processing program; and
a processor that executes the information processing program, wherein
when the processor executes the information processing program, the processor operates as
a compressing-and-writing unit that compresses a file-to-be-written, and writes the compressed-file in a memory area;
a total-file-size calculating unit that
calculates a total-file-size, the total-file-size being a total value of file-sizes of one or more already-written compressed-files, and
updates the total-file-size with a sum of a compressed-file-size and the total-file-size, the compressed-file-size being a file-size of the written compressed-file;
a maximum determining unit that, before the file-to-be-written is written, determines whether a first sum is larger than a maximum size of the memory area or not, the first sum being a sum of an uncompressed-file-size and the total-file-size, the uncompressed-file-size being a file-size of the uncompressed-file-to-be-written;
a compression-rate calculating unit that calculates a compression-rate of the compressed-file based on the uncompressed-file-size and the compressed-file-size;
a predicted-compression-rate calculating unit that calculates a predicted-compression-rate of the uncompressed-file-to-be-written based on the one or more compression-rates of the one or more already-written compressed-files; and
a predicted-file-size calculating unit that calculates a predicted-file-size, the predicted-file-size being a compressed-file-size where the file-to-be-written is compressed based on the predicted-compression-rate, wherein
where the maximum determining unit determines that the first sum is larger than the maximum size,
the maximum determining unit further determines whether a third sum is larger than the maximum size or not, the third sum being a sum of the predicted-file-size and the total-file-size.

2. The information processing apparatus according to claim 1, wherein
where the maximum determining unit determines that the first sum is the maximum size or less,
the total-file-size calculating unit updates the total-file-size by,
before the compressed-file is written,
updating the total-file-size with the first sum, and
after the compressed-file is written,
calculating an increment size, the increment size being an increased size of the memory area after the writing,
updating the total-file-size with a second sum, the second sum being a sum of the increment size and the total-file-size updated with the first sum, and
subtracting the uncompressed-file-size from the total-file-size updated with the second sum to thereby update the total-file-size.

3. The information processing apparatus according to claim wherein
where the maximum determining unit determines that the third sum is the maximum size or less,
the total-file-size calculating unit updates the total-file-size by, before the compressed-file is written,
updating the total-file-size with the third sum, and
after the compressed-file is written,
calculating an increment size, the increment size being an increased size of the memory area after the writing,
updating the total-file-size with a fourth sum, the fourth sum being a sum of the increment size and the total-file-size updated with the third sum, and
subtracting the predicted-file-size from the total-file-size updated with the fourth sum to thereby update the total-file-size.

4. The information processing apparatus according to claim 1, wherein
the predicted-compression-rate calculating unit calculates a predicted-compression-rate of the uncompressed-file-to-be-written based on a minimum compression-rate out of the one or more compression-rates of the one or more already-written compressed-files.

5. An information processing method, comprising:
compressing a file-to-be-written, and writing the compressed-file in a memory area;
calculating a total-file-size, the total-file-size being a total value of file-sizes of one or more already-written compressed-files; and
updating the total-file-size with a sum of a compressed-file-size and the total-file-size, the compressed-file-size being a file-size of the written compressed-file,
wherein the information processing method further comprises:
before the file-to-be-written is written, determining whether a first sum is larger than a maximum size of the memory area or not, the first sum being a sum of an uncompressed-file-size and the total-file-size, the uncompressed-file-size being a file-size of the uncompressed-file-to-be-written;
calculating a compression-rate of the compressed-file based on the uncompressed-file-size and the compressed-file-size;
calculating a predicted-compression-rate of the uncompressed-file-to-be-written based on the one or more compression-rates of the one or more already-written compressed-files;
calculating a predicted-file-size, the predicted-file-size being a compressed-file-size where the file-to-be-written is compressed based on the predicted-compression-rate; and
where it is determined that the first sum is larger than the maximum size, further determining whether a third sum is larger than the maximum size or not, the third sum being a sum of the predicted-file-size and the total-file-size.

6. An information processing apparatus, comprising:
a memory that stores an information processing program; and
a processor that executes the information processing program, wherein
when the processor executes the information processing program, the processor operates as
a compressing-and-writing unit that compresses a file-to-be-written, and writes the compressed-file in a memory area; and
a total-file-size calculating unit that calculates a total-file-size, the total-file-size being a total value of file-sizes of one or more already-written compressed-files, wherein
the total-file-size calculating unit
before the compressed-file is written,
updates the total-file-size with a first sum, the first sum being a sum of an uncompressed-file-size and the total-file-size, the uncompressed-file-size being a file-size of the uncompressed-file-to-be-written, or
updates the total-file-size with a third sum, the third sum being a sum of a predicted-file-size and the total-file-size, the predicted-file-size being a compressed-file-size where the file-to-be-written is compressed based on a predicted-compression-rate, and
after the compressed-file is written,
updates the total-file-size with a value obtained by subtracting the uncompressed-file-size from a second sum, the second sum being a sum of an increment size and the total-file-size updated with the first sum, the increment size being an increased size of the memory area after the writing, the first sum being the total-file-size updated before the compressed-file is written, or
updates the total-file-size with a value obtained by subtracting the predicted-file-size from a fourth sum, the fourth sum being a sum of the increment size and the total-file-size updated with the third sum, the increment size being an increased size of the memory area after the writing, the third sum being the total-file-size updated before the compressed-file is written.

* * * * *